United States Patent [19]
Shealey

[11] Patent Number: 5,551,979
[45] Date of Patent: Sep. 3, 1996

[54] APPARATUS FOR APPLYING TERMINATION PASTE TO ELECTRONIC COMPONENTS

[75] Inventor: Evart D. Shealey, Jamul, Calif.

[73] Assignee: Electro Scientific Industries, Inc., Portland, Oreg.

[21] Appl. No.: 344,404

[22] Filed: Nov. 23, 1994

Related U.S. Application Data

[63] Continuation-in-part of Ser. No. 86,713, Jul. 2, 1993, abandoned.
[51] Int. Cl.$^6$ .................................................. B05C 1/02
[52] U.S. Cl. ............................... 118/70; 118/422; 118/426
[58] Field of Search ..................................... 118/257, 263, 118/422, 423, 425, 426, 413, 70

[56] References Cited

U.S. PATENT DOCUMENTS

| | | | |
|---|---|---|---|
| 4,698,192 | 10/1987 | Kuze et al. | 264/101 |
| 4,888,082 | 12/1989 | Fetcenko et al. | 156/500 |
| 5,248,340 | 9/1993 | Nakagawa et al. | 118/422 |
| 5,275,661 | 1/1994 | Nakagawa et al. | 118/425 |

*Primary Examiner*—Jeffrey Snay
*Attorney, Agent, or Firm*—Thomas J. Tighe

[57] ABSTRACT

A dipping head dips planar arrays of electronic components, disposed in carriers, into sheets of termination paste that are conveyed to a dipping site by a conveyor having an upper planar surface. The sheets are produced atop the conveyor by a doctoring device. The conveyor can be a belt, preferably an endless belt of stainless steel. A wear plate provides vertical support for the belt at the dipping site in order to maintain the planarity of the sheet of termination paste. Preferably the wear plate is perforated with a vacuum source below to hold the belt snug against the plate. The doctoring device is located before (referenced to the direction of belt travel) the dipping site and can be a reservoir of paste riding atop the belt with the paste selectively metered out by raising or lowering of the blade against the belt. A scraper blade can be located after the dipping site to recover leftover paste and guide it into a device which pumps the paste through a filter and back to the reservoir. A tape of cleaning material rubs against a run of the belt, after the scraper blade but before the doctoring device, to further cleanse the belt.

31 Claims, 6 Drawing Sheets

APPARATUS FOR APPLYING TERMINATION PASTE TO ELECTRONIC COMPONENTS

This is a CIP of application Ser. No. 08/086,713, filed Jul. 2, 1993, now abandoned.

BACKGROUND OF THE INVENTION

This invention relates in general to machines for automatically applying termination paste to electronic components during the process Of terminating the components, e.g. multilayer ceramic capacitors, and in particular to machines which dip planar arrays of such components into a sheet of viscous termination paste deposited on a planar surface.

As used herein the term "electronic component" shall refer to multilayer ceramic capacitors, chip resistors, metal film resistors, multilayered ceramic chip varistors, and any other device to which termination paste can be applied in the manner described herein.

An example of how this invention can be used to advantage is in the art of manufacturing multilayer ceramic capacitors, commonly called chip capacitors. In this art, once a chip is created the ends of the chip must be terminated, i.e., capped with an electrically conductive material to provide internal and external electrical connections. The ends are conventionally terminated in a multi-step process wherein they are each coated with a viscous termination "paste", heated to remove volatile liquid ingredients of the paste, and further heated to remove resins and fuse the remaining ingredients (glass frits and conductive particulate) to the chip ends.

In the prior art, elastomeric carriers have been devised which can each hold an array of spaced ceramic capacitor chips such that unterminated ends of the chips protrude a uniform distance from a common planar face of the carrier, and apparatuses have been devised which receive such carriers and dip the protruding chip ends into a uniform sheet of termination paste spread on a planar surface commonly called a platen.

Heretofore such platens have been either stationary or reciprocally movable within a range. For stationary platens the process of dipping the protruding ends has heretofore involved at least the steps of (1) passing a "doctoring" device over the platen, i.e., a device which paints uniform sheets of termination paste onto the platen, (2) lowering the carrier sufficiently to dip the chips' ends into the paste, (3) raising the carrier, and (4) passing a device over the platen to scrape off leftover paste. While the doctoring and scraping operations may be combined into a single step, there are nevertheless several disadvantages to a stationary platen. For one, the spacing of the carrier above the platen during doctoring and scraping must be great enough to allow the doctoring/scraping devices to pass beneath. This means that the dipping stroke is much longer than if such passage beneath was not necessary, and a longer dipping stroke translates into fewer strokes per unit time for a given dipping head drive. Also, the dipping rate is limited by the delay between dips while the doctoring/scraping devices move back and forth over the platen. Such back and forth movement is not time efficient.

For the movable platens the process of dipping the protruding ends has heretofore involved at least the steps of (1) moving the platen so that it passes beneath a doctoring device to paint a sheet of paste on the platen, (2) moving the platen back beneath the carrier, (3) lowering the carrier sufficiently to dip the chips' ends into the paste, (4) raising the carrier, and (4) again moving the platen so that it passes beneath a device which scrapes off leftover paste. While the doctoring and scraping operations may be combined into a single step, there are nevertheless several disadvantages to such a movable platen. The dipping rate is limited by the delay between dips while the platen is moved back and forth beneath the doctoring/scraping devices. This reciprocating movement is more time consuming than if movement were in one direction only, and the stroke of this back and forth movement increases as the length of the carrier increases. Moreover, precisely timed actuators must be used to raise and lower the scraping device, and open and close a doctor blade while the platen reciprocates beneath.

Another problem exists in the prior art. Components being held by the elastomeric carriers are often pulled loose by the adhesive force of the paste. In these carriers the components are inserted into respective perforations in an elastomeric sheet. The perforations are slightly undersized with respect to the components they are designed to hold, and so the components are held by friction between them and the elastic walls of their respective slots. For various reasons the adhesive force of the paste combined with gravity can sometimes overcome the friction and dislodge components. These loose components can foul up subsequent operations, particularly in apparatuses that scrape the leftover paste back into the reservoir from which the sheets are painted. Most, if not all, prior art apparatuses do this. The presence of dislodged components in the reservoir can cause streaks of discontinuity in subsequent sheets being painted with obvious undesirable results.

This invention overcomes the above-described time related disadvantages of both the stationary and reciprocating platens and the problem of dislodged components. Further advantages and attributes will be seen from a reading of the text hereinafter.

SUMMARY OF THE INVENTION

An object of this invention is to provide an apparatus for applying terminating paste to arrays of electronic components that is more time efficient than the prior art.

A further object of this invention is to provide an apparatus, for applying terminating paste to arrays of electronic components, having a significantly shorter dipping stroke than apparatuses with a fixed platen.

A further object of this invention is to provide an apparatus, for applying terminating paste to arrays of electronic components, which does not require the reciprocal motion related to doctoring and scraping as is required in the fixed and reciprocating platens of the prior art.

A further object of this invention is to provide an apparatus, for applying terminating paste to arrays of electronic components, having in effect a uni-directionally indexing platen.

A further object of this invention is to provide an apparatus, for applying terminating paste to arrays of electronic components, having effectively a two-part platen consisting of a fixed planar support and a means for conveying a uniform plane of termination paste to the support, e.g. an endless conveyor belt.

A further object of this invention is to provide an apparatus, for applying terminating paste to arrays of electronic components, having a system for filtering and recirculating the termination paste that is leftover from dipping operations, particularly to filter out components that have become dislodged from an array during dipping.

These and other objects, which will be apparent from a reading of the text, are accomplished by an apparatus for applying termination paste to an array of electronic components held by a carrier such that the portions of the components to which the paste is to applied are protruding from the carrier generally in a common plane. The apparatus has at least (1) a conveyance means, having an upper planar surface, for delivering termination paste to a dipping site, (2) a means for producing a uniform sheet of termination! paste atop the planar surface, (3) a vertical support, disposed at said dipping site, for vertically supporting the conveyance means in order to maintain the planarity of the sheet of termination paste, and (4) a means, registered with said dipping site, for dipping the protruding portions of the array into the sheet of termination paste and for subsequently withdrawing the array from the paste. The conveyance means can be embodied in a belt for providing a movable planar surface at least as wide as a maximum width of the sheet of termination paste, the sheet of paste being produced atop an area of the belt, and means for passing the belt over the vertical support until the area containing the sheet is in registration with the dipping site. Preferably the belt is an endless belt, the sheets of paste are painted on the belt by a reservoir and doctor blade disposed before (referenced to the direction of belt travel) the dipping site, and located after the dipping site is a means for scraping the leftover paste from the belt, filtering it and pumping it back to the reservoir. Optionally the apparatus can include a means for further cleansing the belt.

DESCRIPTION OF THE PREFERRED EMBODIMENT

Figure 1:
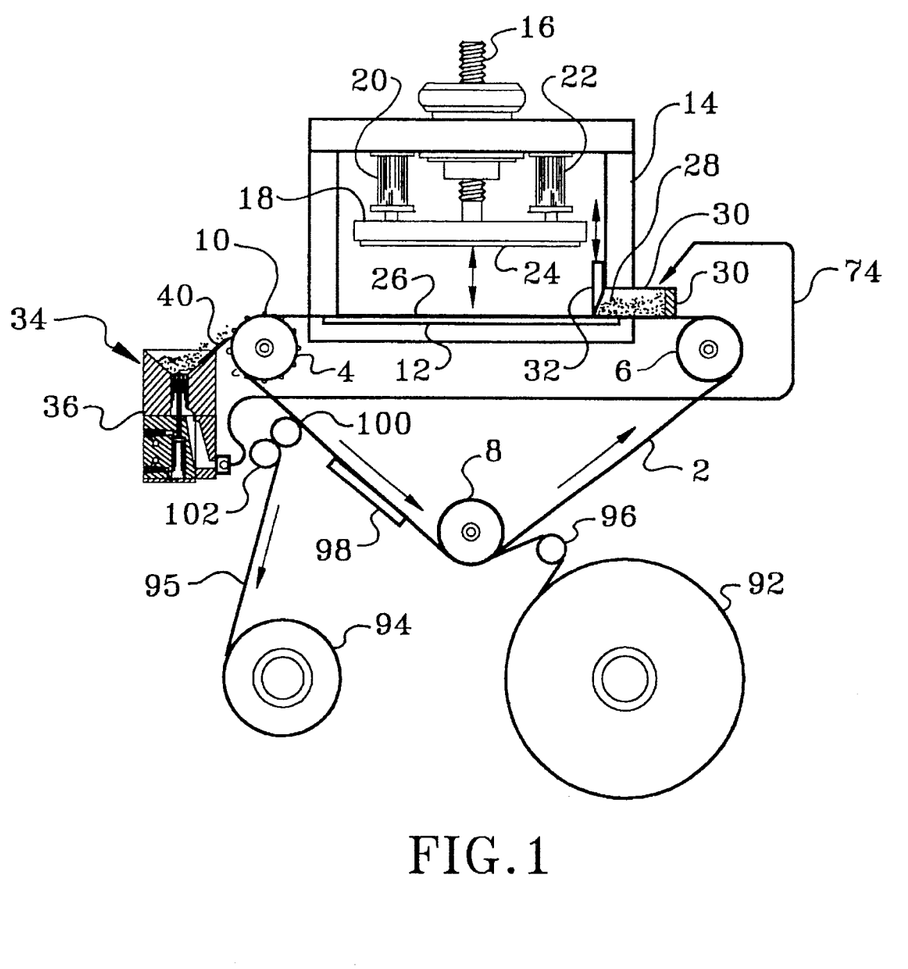
FIG. 1 is a diagrammatical representation of this invention having a first embodiment of a paste pump.

Referring to FIG. 1, a preferred embodiment of this invention is illustrated to have an endless belt 2, preferably a smooth metallic belt, which extends around a drive pulley 4 and two idler pulleys, 6 and 8. The belt 2 can be made from a stainless steel strip approximately 0.008 inches thick with the ends seamlessly welded together. Drive pulley 4 has sprockets 10 which engage perforations (not shown) along an edge of the belt. Idler pulley 8 can be part of a conventional belt tension compensating mechanism. A horizontal run of the belt passes over an intermediate horizontal plate 12 which is preferably a wear plate with perforations (not shown) open to a conventional vacuum source (not shown) to keep the horizontal run of the belt snug against the plate. The plate provides vertical planar support for the belt. A superstructure 14 supports a dipping mechanism illustrated herein as having a lead screw 16 which moves a rectangular dipping head 18 up and down over a range, the movement of the head being precisely guided by four guide bearings (only two shown, 20 and 22) disposed generally at the corners of the head. The lead screw is preferably a ball screw and can be driven by conventional means, e.g. a servo or stepper motor (not shown). Temporarily mounted on the bottom side of the dipping head is a conventional carrier 24 containing the electronic components to be dipped. The dipping head is in registration with a dipping site 26 which is illustrated as an area directly below the dipping head, the size of the area being predetermined by the size of the chip array in the carrier.

Referring again to FIG. 1, the belt 2 is moved in steps, i.e., it is indexed by indexing the rotation of the drive pulley 4 which can be done by conventional means. For each step of movement, the belt can serve to convey a sheet of termination paste (not shown) to the dipping site 26. Once a sheet of paste is at the dipping site, the belt is stopped and the dipping mechanism lowers a carrier 24 sufficiently to dip electronic components protruding therefrom into the paste. Subsequently the dipping head raises the carrier and the belt moves another step delivering another sheet of paste to the dipping site. In this fashion a fresh sheet of paste can be delivered for each dipping operation.

Referring again to FIG. 1, a sheet of paste can be produced on the belt each time it moves a step and a device by which the termination paste sheets can be produced is illustrated as a reservoir 28 of termination paste riding on the belt at a location preceding (referenced to the direction of belt travel) the dipping site 26. The reservoir is confined on three sides by walls 30 which extend down to the belt. On the side facing the dipping site the reservoir is confined by a doctor blade 32. Each time the belt is moved a step, the doctor blade can be raised if it is desired to paint a sheet of paste during the movement. In such a case, the doctor blade is raised by conventional means to a predetermined height allowing the termination paste to flow along the belt at a thickness determined by the gap between the doctor blade and the belt. The reservoir traverses the belt laterally at least to an extent necessary to produce sheets of a desired width. When the belt is stopped, or sooner depending on the size of the steps and the relative locations of the reservoir and the dipping site, the doctor blade is lowered cutting off the flow of termination paste. In any case the doctor blade is kept in the raised position until a length of belt has passed beneath it equal to or greater than the length of the array that is going to be dipped into the sheet being produced therefrom.

Figure 2:
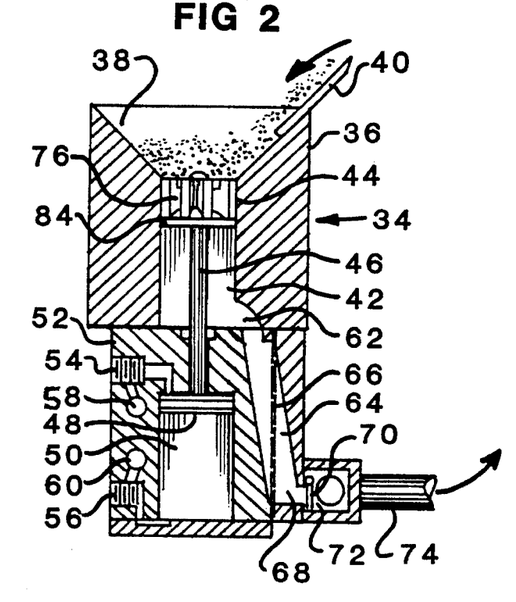
FIG. 2 is a cross-sectional view of the paste pump illustrated in FIG. 1.

Referring to FIGS. 1 and 2, a device for recovering termination paste from the belt 2, filtering it and pumping it back to the reservoir 28 is generally designated 34. As illustrated the device has a head 36 which defines an elongated V-shaped trough 38 the mouth of which is open at the top of the head. Extending from a lip of the mouth and generally coextensive with the trough is a scraper blade 40 which is used to scrape paste off the belt and guide the paste into the trough. The length of the trough and scraper blade are preferably equal to or greater than the width of the paste sheets painted on the belt, and they are disposed transverse to the belt and proximate thereto for a long edge of the scraper blade remote from the trough to impinge the belt just as the belt makes its downward turn around the drive pulley 4. Thus as the leftover paste moves beyond the dipping site it is scraped off the belt and guided into the trough as indicated by the arrow at the mouth of the trough in FIG. 2. Preferably the scraper blade is made from a material, such as certain plastic, that will not scratch the belt.

Referring again to FIGS. 1 and 2, communicating with the base of the trough are a plurality of vertical cylinders 42 defined by the head 36. Disposed in each cylinder is a pump piston 44 connected to a vertical driving rod 46. The driving rods each extend below the head and into a base block 52, to which the head is affixed, via bores defined by the base block, and are connected to respective pneumatic pistons 48. The pneumatic pistons are disposed in respective pneumatic cylinders 50 defined by base block. Pneumatic connections, 54 and 56, communicate with plenums, 58 and 60 respectively, which in turn communicate with all the pneumatic cylinders above and below, respectively, their pneumatic pistons. Thus by the alternating application of pneumatic pressure through the connections, the pneumatic pistons and consequently their connected pump pistons can be made to reciprocate in their respective cylinders. Communicating with the base of each head cylinder 42 is a channel 62 which leads to a filter chamber 64. The filter chamber is partitioned in two by a filter screen 66 and at the base of the filter chamber, on a side of the screen opposite from the channel 62, is an outlet 68 the mouth of which is closable by a check valve 70. When the check valve is open, the outlet communicates with an elongated collection chamber 72 which communicates via a conduit 74 with the reservoir 28. Thus, there is a separate filter chamber for each pump piston, the outlets of which commonly feed into the collection chamber.

Figure 19:
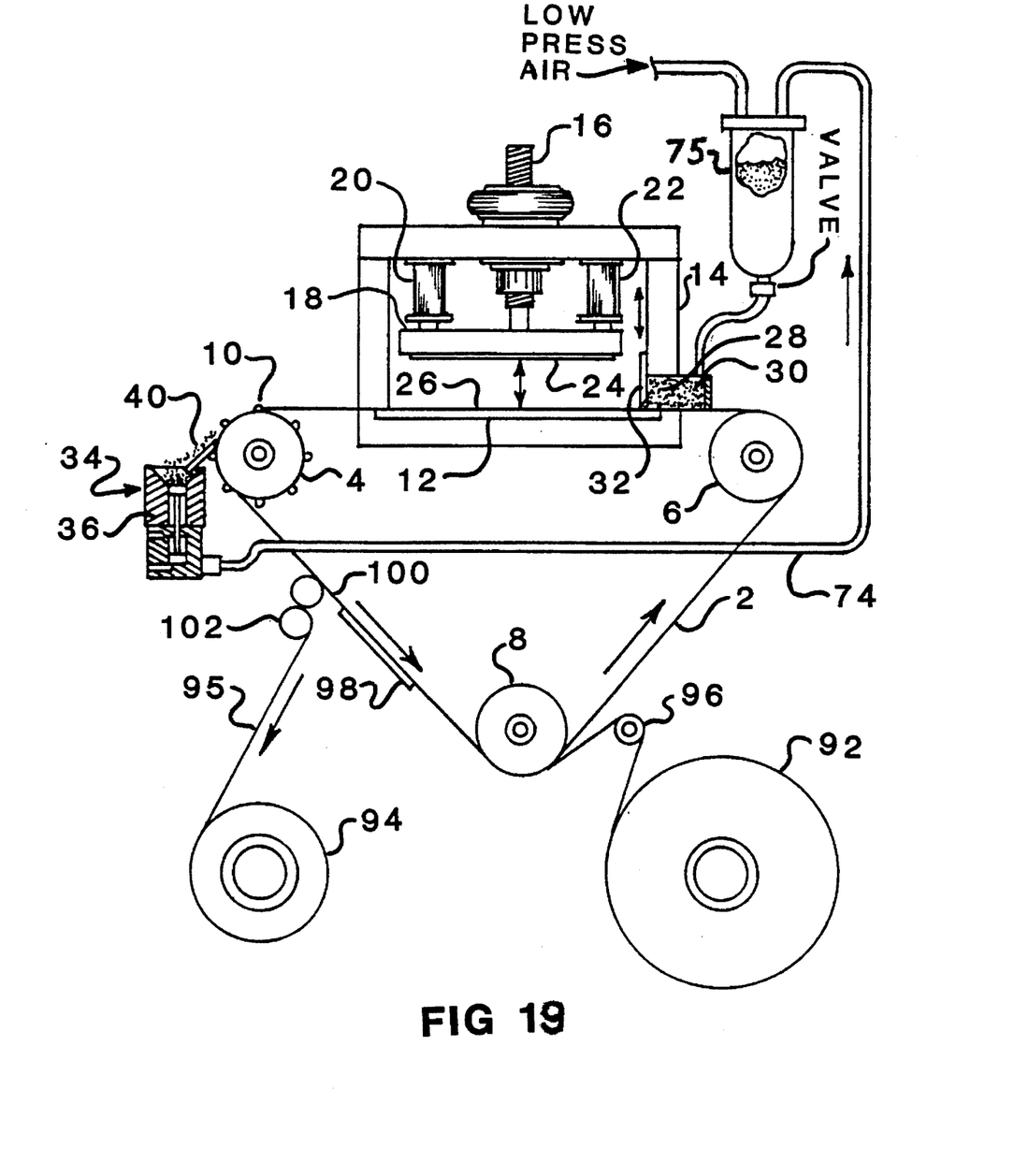
FIG. 19 is a diagrammatical representation of a second embodiment of this invention.

Referring to FIG. 19, an additional paste reservoir 75 kept under low air pressure may be interposed between conduit 74 and reservoir 28 to control the past level in the reservoir 28. The returning paste is deposited into the additional reservoir 75 and routed to reservoir 28 through an outlet valve that is selectively open according to the level of past in reservoir 28.

Figure 7A:
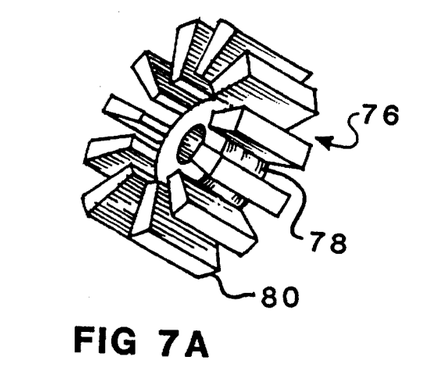
FIG. 7A is a pictorial view of a spider support which is a member of a pump piston illustrated in FIG. 2.
Figure 7B:
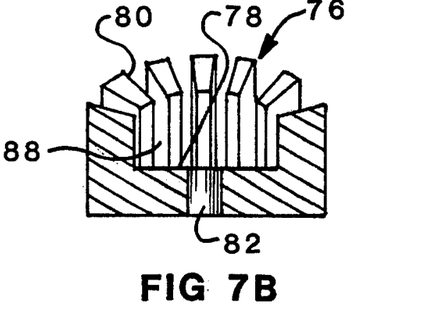
FIG. 7B is a cross-sectional view taken along the median of the spider support also illustrated in FIG. 7A.
Figure 7C:
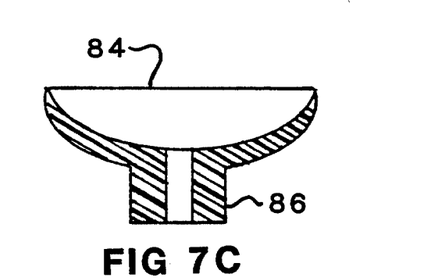
FIG. 7C is a cross-sectional view taken along the median of a diaphragm which is a part of a pump piston of FIG. 2.
Figure 8:
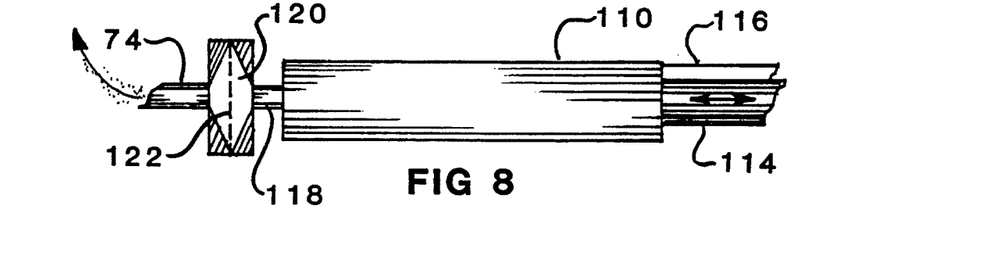
FIGS. 8–11 are illustrations of a second embodiment of a paste pump.

Referring to FIGS. 7A–7C, the major elements of a pump piston are illustrated to be a spider frame, generally designated 76, which basically has a hub 78 and a plurality of vanes 80 radiating from the hub. A center bore 82 defined by the hub allows the spider frame to be bolted onto a driving rod. A bottom side of the frame is conically concave to generally conform to the outside curvature of a diaphragm 84 which mates with the spider frame hub. An annular projection 86 of the diaphragm fits into an annular vane gap 88.

Figure 3:
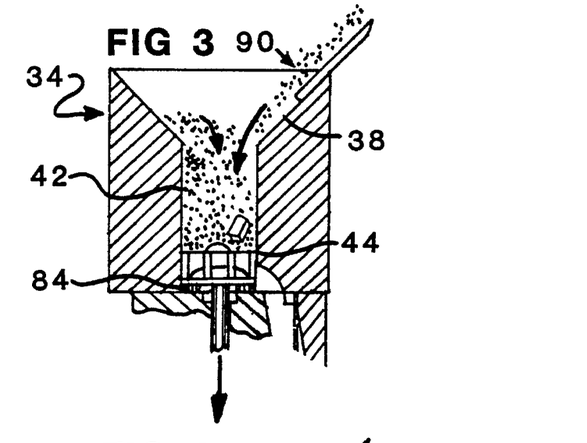
FIGS. 3–6 are cross-sectional illustrations of the operation of the paste pump of FIG. 1.
Figure 4:
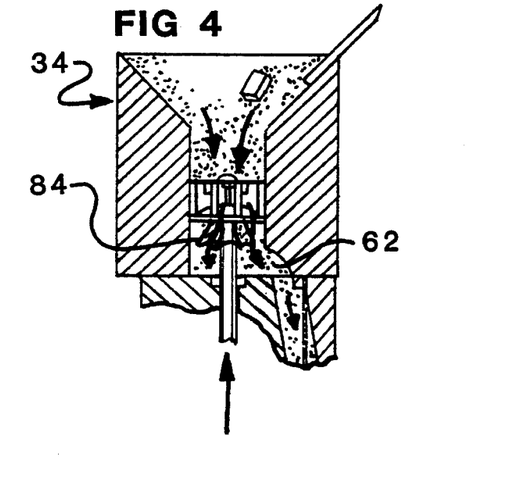
Figure 5:
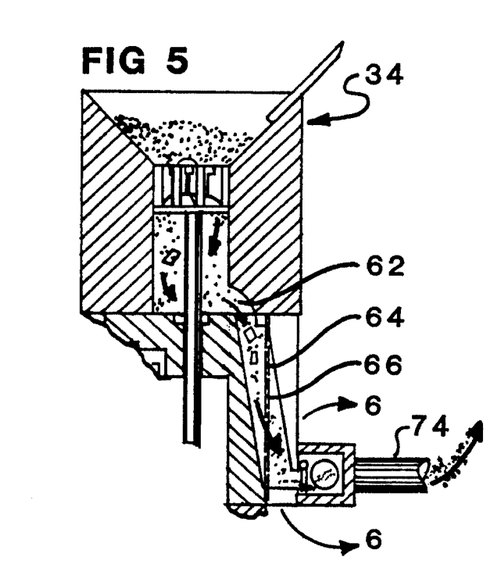
Figure 6:
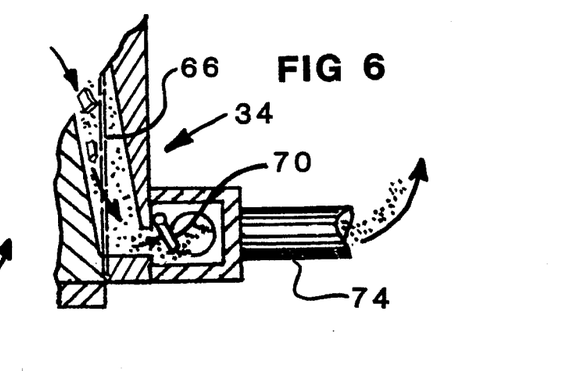

Referring to FIGS. 3–6, the paste pumping operation of the device 34 (FIG. 1) is illustrated. FIG. 3 shows the end of a down stroke of the pump piston. During the down stroke the form of the diaphragm 84 is supported by the spider frame 76, and because the diaphragm snugly fits the cylinder when in full form, the down stroke draws paste 90 that has accumulated in the trough 38 into the cylinder 42. FIG. 4 shows the pump piston midway in its up stroke. During the up stroke the form of the diaphragm is not supported by the spider frame and therefore it will collapse under the pressure from the paste in the cylinder, and a partial vacuum is created below the diaphragm. When it collapses paste will flow through the spider frame and past the pump piston and gravity will pull the paste toward the channel 62. FIG. 5 shows the beginning of the down stroke again. This time there is paste below the piston. Since the form of the diaphragm is being supported by the spider frame, the piston will force the paste below it into the channel and the filter chamber 64. In this way the piston acts as a one-way flow valve. As the pump piston continues to reciprocate, more and more paste will be forced into the filter chamber. This accumulation of pressure will cause the paste to flow through the filter screen 66, past the check valve 70, and ultimately back to the reservoir 28 (FIG. 1). The filter screen will catch dislodged chips and other debris too large to pass through and prevent them from entering the reservoir.

Referring again to FIG. 1, a means for cleansing the belt is illustrated as having a source spool 92 and a take-up spool 94. The source spool provides a roll of cleansing tape 95 which travels around a positioning idler 96, comes into contact with the belt as they go in opposite directions around the same arc of pulley 8 as does the belt, continues its contact with the belt as they both pass by a pressure plate 98, and breaks off contact with the belt as it goes around capstan drive pulleys, 100 and 102, on its way to the take-up spool. The cleansing tape can be made from porous, non-stretch paper or cloth, or other suitable material which has the property of being able to absorb paste from the belt without wearing on the belt or damaging it. Preferably the tape is expendable.

Figures 9, 10, 11:
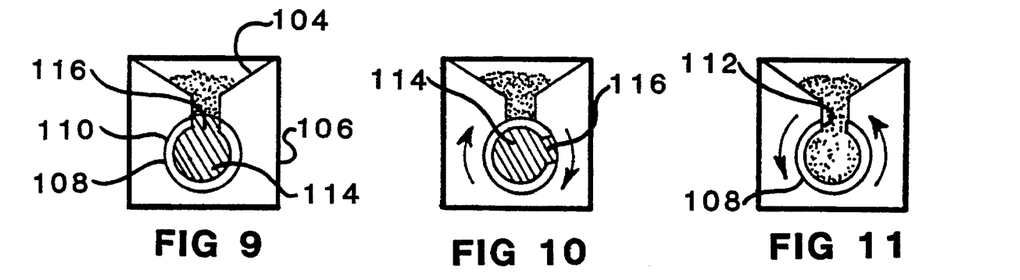

Referring to FIGS. 8–11, a second embodiment of a paste pump is illustrated to have an open, elongated, Y-shaped trough 104 defined by a block 106. At the base of the trough and parallel thereto is a cylindrical bore 108. Disposed in the bore is a sleeve 110 which can axially rotate in the bore. The sleeve defines a longitudinal slot 112 which communicates with the trough when the slot is aligned with the trough base. In operation, paste accumulating in the trough will be drawn by gravity through the slot and into the hollow of the sleeve. At one end a piston 114 is partially inserted into the sleeve, as illustrated in FIG. 9. The piston has a longitudinal key 116 which mates with the sleeve slot 112. To expel paste from the sleeve hollow, the piston is axially rotated causing the sleeve to rotate and close communication between the hollow of the sleeve and the trough, as illustrated in FIG. 10. The piston is then fully inserted into the! sleeve driving the paste toward the opposite end of the sleeve where an outlet 118 feeds the paste into a filter chamber 120. The pressure applied by the piston causes the paste to pass through a filter screen 122 and back to the reservoir via a conduit 74. The piston is then rotated to realign the sleeve slot with the trough and then withdrawn to its original position. The withdrawal of the piston creates a partial vacuum and draws paste into the sleeve hollow.

Figure 12:
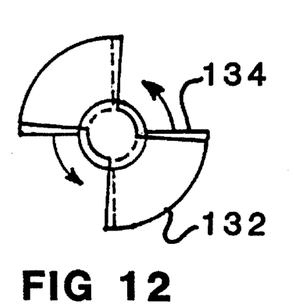
FIGS. 12–15 are illustrations of a third embodiment of a paste pump.
Figure 13:
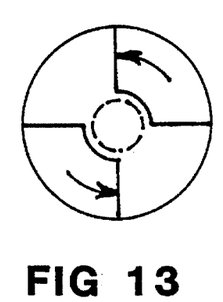
Figure 14:
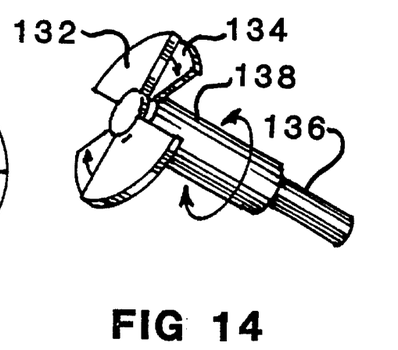
Figure 15:
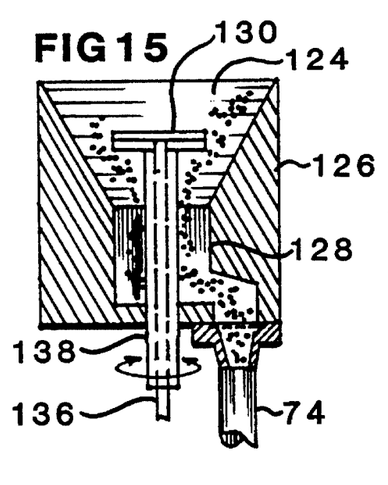

Referring to FIGS. 12–15, a third embodiment of a paste pump is illustrated to have an open, elongated, V-shaped trough 124 defined by a head 126. Communicating with the base of the trough are a plurality of vertical cylinders 128 defined by the head. Disposed in each cylinder is a pump piston 130 having two pairs of horizontal, opposed blades, 132 and 134. An upper pair 132 is connected to a vertical driving rod 136. The lower pair 134 is connected to a sleeve 138 around the driving rod. By rotating the sleeve to a first position, as shown in FIG. 12, the piston can define two openings for paste to pass by, but by rotating the sleeve to a second position, as shown in FIG. 13, the piston can be closed preventing passage thereby of paste. In this way the piston presents a one-way flow valve to paste in the cylinder. By reciprocating the piston as explained with reference to the embodiment of FIG. 2 and it can pump paste as in the first embodiment.

Figure 16:
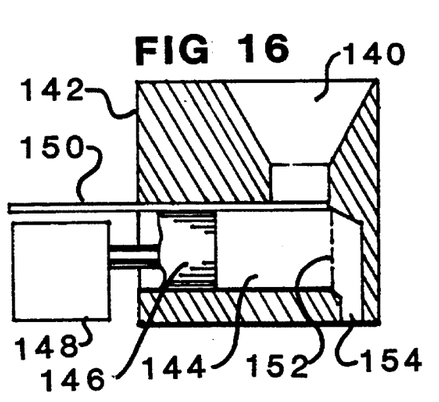
FIG. 16 is an illustration of a fourth embodiment of a paste pump.

Referring to FIG. 16, a fourth embodiment of a paste pump is illustrated to have an open, elongated, Y-shaped trough 140 defined by a head 142. Communicating with the base of the trough is a rectangular cylinder 144 in which a rectangular piston 146 reciprocates by action of an actuator 148. This communication can be closed by a gate valve 150. In operation, paste accumulating in the trough is allowed to drop into the cylinder when the gate valve is periodically opened. Thereafter the valve is closed and the piston actuated to move toward filter screen 152. The pressure applied by the piston forces paste through the screen and out an outlet 154 where it eventually goes to the reservoir.

Figure 17:
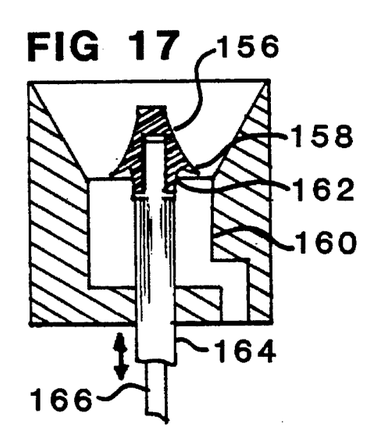
FIGS. 17 and 18 are illustrations of a fifth embodiment of a paste pump.
Figure 18:
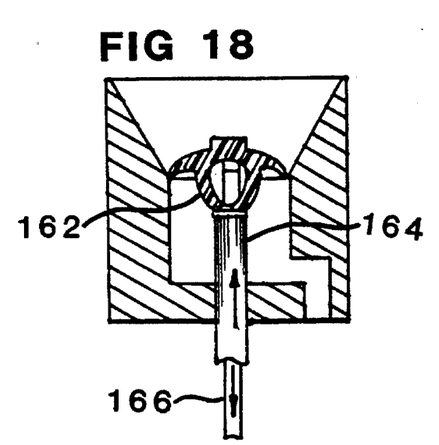

Referring again to FIGS. 17 and 18, a fifth embodiment of a paste pump is illustrated to have an elastomeric piston 156 with a skirt 158 reciprocating in a cylinder 160 in communication with a V-shaped trough. The skirt is annular to a piston core 162 which is connected to a sleeve 164 coaxially and slidably disposed around a driving rod 166. When the sleeve is moved in the direction of the piston, the core expands causing the skirt to flare out and when the sleeve is moved in the opposite direction, the core and the skirt to contract. By selective operation of the sleeve, the piston can be operated as a one-way flow valve and therefore function as a paste pump similar to the first and third embodiments.

Figure 20:
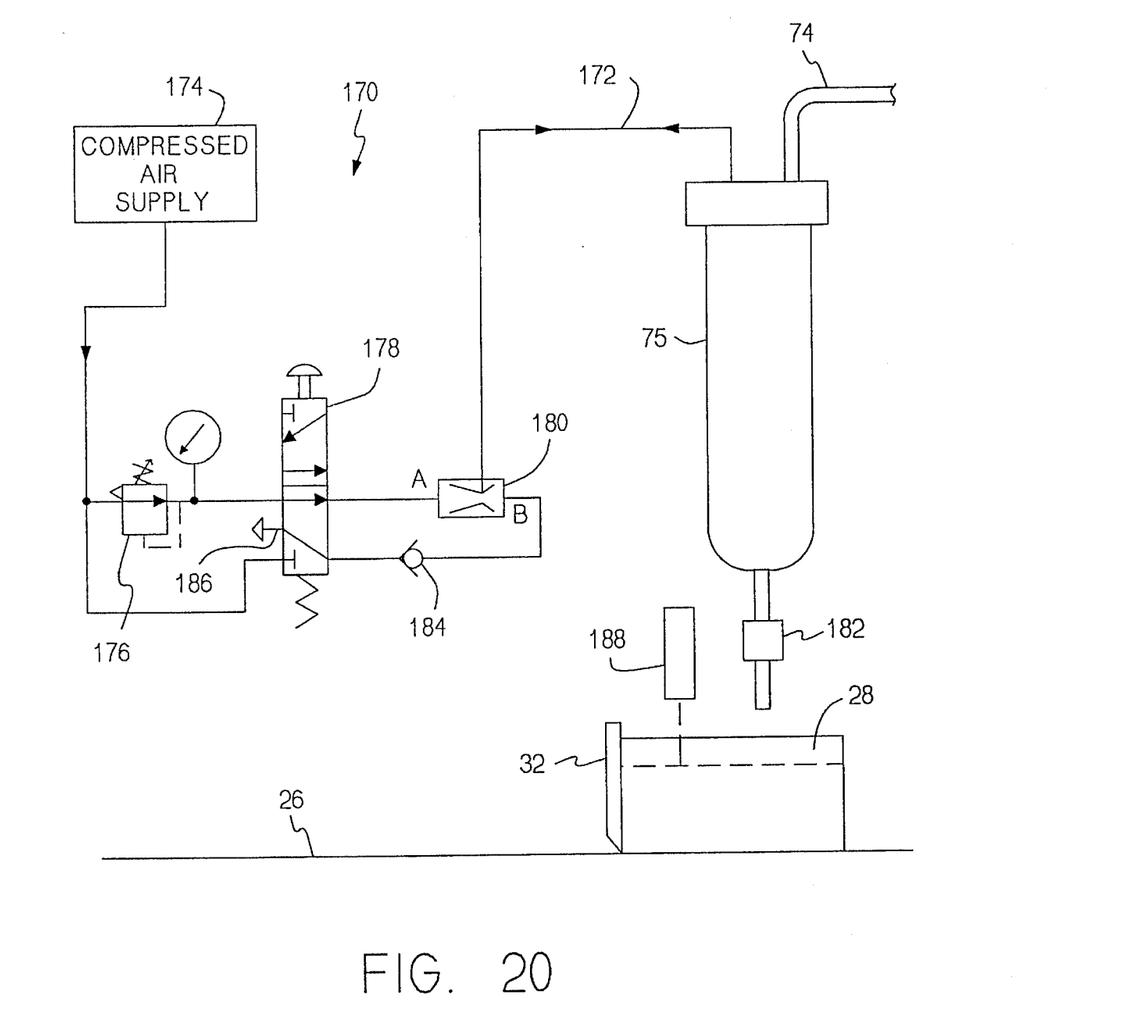
FIG. 20 is a diagrammatical representation of a paste reservoir portion of a third embodiment of this invention.

Referring to FIG. 20, the reservoir 75 can communicate with a pneumatic control device, generally 170, via an air line 172. The control device has a compressed air supply 174 which supplies pressurized air to input ports of a relieving pressure regulator 176 and a two position valve 178. Preferably the pressure regulator has an adjustable threshold and provides a monitoring gage, both as illustrated. When the valve is in a rest position, the valve provides one-way communication of pressure from the output of the pressure regulator to port "A" of a venturi vacuum generator 180 which in turn communicates the pressure into the reservoir 75 via line 172. This pressure urges the termination paste out of the reservoir whenever a pinch valve 182 is opened. The valve is biased to normally be in the rest position. When the valve is moved to its other ("unrest") position, it opens the communication path between the pressure regulator and port "A" of the vacuum generator and completes a second path from the compressed air supply to port "B" of the vacuum generator via a one-way check valve 184 which is then opened. The valve being in the unrest position also completes a path from port "A" of the vacuum generator to an exhaust port 186. Thus when the valve 178 iS in its rest position, regulated air pressure is communicated to the reservoir 75 via line 172, but when the valve is in its unrest position, a partial vacuum is created in the reservoir, i.e. significantly less than ambient air pressure, via line 172.

In operation, the Valve 178 is moved to its unrest position for two reasons. One is to draw paste into the reservoir 75 from the return line 74 and from the paste pump whenever desired, such as when shutting down the machine. The paste is expensive. Another is to draw paste through the pump for situations in which the pump is dry of paste and needs priming. Priming with paste wets check valves and seals i$_n$ the pump to allow them to function properly.

Referring again to FIG. 20, a height gage 188 is used to monitor the level of paste in the first reservoir 28. This gage is preferably a laser triangularization device that produces an analog signal corresponding to the paste level. An example of such a device is an LM 100 Laser Analog Sensor sold by Aromat Corporation. The analog output of the gage is digitized and then communicated to a comparator which compares the digitized paste level signal with a pre-set threshold. If the level is below the threshold, including a predetermined tolerance, the comparator causes the pinch valve 182 to open in order to transfer paste from the second reservoir 75 to the first reservoir 28. Preferably the pinch valve is pneumatically controlled and the comparator actuates a solenoid which overcomes a bias to open the valve, the bias tending to keep the pinch valve closed. The comparator can be implemented in software, such as in the computer that preferably controls the various embodiments of this invention.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims. For example, the movement of the belt may be more finely indexed than as discussed above in order to more finely position the paste sheets, for slightly offsetting the paste sheet after a dip in order to get another dip from the same sheet, and for other purposes. Moreover by selective operation of the doctor blade, blank surfaces or painted surfaces can be selectively conveyed to the dipping site for each full step of the belt.

I claim:

1. An apparatus for applying termination paste to an array of electronic components held by a carrier such that the portions of the components to which the paste is to applied are protruding from the carrier generally in a common plane, said apparatus comprising:

(a) means, having an upper planar surface, for conveying termination paste to a dipping site, (b) means for producing a uniform sheet of termination paste atop the planar surface, (c) means, disposed at said dipping site, for vertically supporting said means for conveying in order to maintain the planarity of the sheet of termination paste, and (d) means, registered with said dipping site, for dipping the protruding portions of the array into the sheet of termination paste and for subsequently withdrawing the array from the paste.

2. The apparatus according to claim 1 wherein the means for producing a uniform sheet of termination paste comprises:

(a) a reservoir of termination paste, and (b) means, selectively opened and closed, for metering out a planar sheet of paste from the reservoir.

3. The apparatus according to claim 2 wherein the means for metering out the paste comprises blade means for doctoring the paste exiting the reservoir.

4. The apparatus according to claim 2 wherein the reservoir is a first reservoir, and further comprising:

(a) a second reservoir of paste for communicating paste to the first reservoir, and (b) valve means, selectively opened, for controlling the communication of paste from the second reservoir to the first, no communication taking place when the valve means is closed.

5. The apparatus according to claim 4 further comprising:

(a) means for sensing the level of paste in the first reservoir and producing a signal corresponding to the level, and (b) means for opening the valve means whenever the signal is below a predetermined threshold.

6. The apparatus according to claim 4 further comprising means for pressurizing the paste within the second reservoir.

7. The apparatus according to claim 1 further comprising means for recovering termination paste from the planar surface, means for filtering recovered paste, and means for communicating recovered and filtered paste to said means for producing.

8. The apparatus according to claim 7 wherein the means for producing a uniform sheet of termination paste comprises:
(a) a reservoir of termination paste, and
(b) means, selectively opened and closed, for metering out a planar sheet of paste from the reservoir.

9. The apparatus according to claim 8 wherein the means for metering out the paste comprises blade means for doctoring the paste exiting the reservoir.

10. The apparatus according to claim 8 wherein the reservoir is a first reservoir, and further comprising:
(a) a second reservoir of paste for communicating paste to the first reservoir,
(b) valve means, selectively opened, for controlling the communication of paste from the second reservoir to the first, no communication taking place when the valve means is closed, and
(c) wherein the means for communicating recovered and filtered paste communicates same to the second reservoir.

11. The apparatus according to claim 10 further comprising:
(a) means for sensing the level of paste in the first reservoir and producing a signal corresponding to the level, and
(b) means for opening the valve means whenever the signal is below a predetermined threshold.

12. The apparatus according to claim 10 further comprising means for applying fluid pressure to the paste within the second reservoir.

13. The apparatus according to claim 10 further comprising means for selectively applying fluid pressure or a vacuum to the paste within the second reservoir.

14. The apparatus according to claim 1 wherein the means for conveying the termination paste to the dipping site comprises:
(a) belt means for providing a movable upper planar surface at least as wide as a maximum width of the sheet of termination paste, the sheet of termination paste being produced atop an area of the planar surface, and
(b) means for passing the belt means over said means for vertically supporting until said area is in registration with the dipping site.

15. The apparatus according to claim 14 further comprising means for recovering termination paste from the planar surface of the belt means, means for filtering recovered paste, and means for communicating recovered and filtered paste to said means for producing.

16. The apparatus according to claim 14 wherein the belt means is an endless belt rotating in a direction, and further comprising means for recovering termination paste from the belt disposed beyond, with respect to the direction of belt rotation, the dipping site.

17. The apparatus according to claim 16 further comprising means for cleaning the belt means.

18. The apparatus according to claim 17 wherein said means for cleaning the belt means comprises:
(a) a tape of cleaning material,
(b) means for moving the tape in a direction opposite to the direction the belt means is traveling, and
(c) means for putting the tape in contact with the belt means along a run of the belt means.

19. The apparatus according to claim 16 further comprising means for filtering recovered paste, and means for communicating recovered and filtered paste to said means for producing.

20. The apparatus according to claim 19 further comprising means for means for cleaning the belt means.

21. The apparatus according to claim 20 wherein said means for cleaning the belt means comprises:
(a) a tape of cleaning material,
(b) means for moving the tape in a direction opposite to the direction the belt means is traveling, and
(c) means for putting the tape in contact with the belt means along a run of the belt means.

22. The apparatus according to claim 14 further comprising:
(a) pump means, disposed beyond the dipping site, for pumping paste to said means for producing the sheet of termination paste,
(b) an inlet defined by said pump means, and
(c) means for scraping paste off the belt means and guiding it into the inlet.

23. The apparatus according to claim 22 further comprising means for filtering components from paste that is scraped off the belt means.

24. The apparatus according to claim 22 wherein the pump means comprises:
(a) an outlet communicating with said means for producing the sheet of termination paste
(b) a cylindrical tube disposed in a cylinder defined by the pump means, the cylinder having a side opening for communicating with the inlet and an end opening for communicating with the outlet, the tube being rotatable between at least a first and a second position,
(c) side opening means, defined by the tube, for admitting paste into the tube when the tube is in the first position, i.e., aligned with the side opening of the cylinder,
(d) end opening means, defined by the tube, for communicating with the end opening of the cylinder when the tube is in the second position, the side opening means of the tube being closed by the cylinder wall when the tube is in the second position,
(e) means for reciprocatingly rotating the tube between at least the first and second positions, and
(f) means for pushing paste from the tube out the tube's end opening means whenever the tube is in the second position.

25. The apparatus according to claim 22 wherein the pump means comprises:
(a) an outlet communicating with said means for producing the sheet of termination paste
(b) at least one cylinder defined by the pump means including a side opening for communicating with the inlet and an ending opening for communicating with the outlet,
(c) a piston reciprocating in each of said at least one cylinder, and
(d) each piston including a head laterally co-extensive with the cylinder in which the piston reciprocates, paste being drawn into the cylinder via the inlet during a return stroke of the piston, paste being pushed out the outlet during a forward stroke of the piston.

26. The apparatus according to claim 22 further comprising means for priming said pump means.

27. The apparatus according to claim 22 wherein the pump means comprises:
- (a) an outlet communicating with said means for producing the sheet of termination paste,
- (b) at least one cylinder communicating with the inlet and the outlet,
- (c) a piston reciprocating in each of said at least one cylinder, and
- (d) each piston including a head laterally co-extensive with the cylinder in which the piston reciprocates, each piston head comprising a one-way flow valve, the valve of each piston being closed during a pump stroke of the piston during which paste is pushed out the outlet and during which paste is drawn from the inlet into the piston's cylinder, and the valve being open during the return stroke to allow paste to pass by the piston's head.

28. The apparatus according to claim 27 wherein the one-way flow valve comprises a spider frame including passages for paste to flow thereby, and a collapsible diaphragm that closes the passageways when uncollapsed, the spider frame preventing collapse of the diaphragm during the piston's pump stroke, the diaphragm collapsing during the piston's return stroke.

29. The apparatus according to claim 27 wherein the one-way flow valve comprises:
- (a) at least one opening defined by the piston head through which paste can pass by the head,
- (b) blade means for closing said at least one opening, the blade means being rotatable between at least two positions: a first position at which the blade means closes said at least one opening and a second position at which said at least one opening is open, and
- (c) means for rotating the blade means to the first position for pump strokes of the piston, and for rotating the blade means to the second position for return strokes of the piston.

30. The apparatus according to claim 27 wherein the one-way flow valve comprises:
- (a) an elastomeric piston head with a skirt that blocks passage of paste by the piston head when the skirt is expanded but permits passage of paste when collapsed, and
- (b) means for expanding the skirt for pump strokes of the piston, and for collapsing the skirt for return strokes of the piston.

31. The apparatus according to claim 27 further comprising filter means, interposed between said outlet and the means for producing a sheet of termination paste, for filtering components from paste that is scraped off the belt means.

* * * * *